US012805498B2

(12) United States Patent
Grosell

(10) Patent No.: US 12,805,498 B2
(45) Date of Patent: Nov. 24, 2026

(54) Y-TUBE HOOK SYSTEM

(71) Applicant: Pure Fishing, Inc., Spirit Lake, IA (US)

(72) Inventor: Mads Grosell, Copenhagen (DK)

(73) Assignee: Pure Fishing, Inc., Spirit Lake, IA (US)

( * ) Notice: Subject to any disclaimer, the term of this patent is extended or adjusted under 35 U.S.C. 154(b) by 0 days.

(21) Appl. No.: 18/736,219

(22) Filed: Jun. 6, 2024

(65) Prior Publication Data

US 2025/0374900 A1 Dec. 11, 2025

(51) Int. Cl.
*A01K 85/16* (2006.01)
*A01K 85/00* (2006.01)

(52) U.S. Cl.
CPC .......... *A01K 85/16* (2013.01); *A01K 85/1837* (2022.02); *A01K 85/1851* (2022.02)

(58) Field of Classification Search
CPC ................ A01K 85/16; A01K 85/1837; A01K 85/1851; A01K 85/1857; A01K 85/00; A01K 85/02
USPC ............................ 43/42, 42.36, 42.35, 42.37
See application file for complete search history.

(56) References Cited

U.S. PATENT DOCUMENTS 861,116 A * 7/1907 Heddon ................ A01K 85/16 43/42.34
1,490,161 A * 4/1924 Dickman .............. A01K 85/16 43/42.49
1,583,199 A * 5/1926 Taylor .................... A01K 85/16 43/42.42
2,208,827 A * 7/1940 Accetta .................. A01K 85/16 43/42.43
2,389,883 A * 11/1945 Worden ................. A01K 85/16 43/42.42
2,582,627 A * 1/1952 Gaylord ................. A01K 85/16 43/42.23
2,812,609 A * 11/1957 Lema ..................... A01K 85/16 43/42.28

(Continued)

FOREIGN PATENT DOCUMENTS

EP 2567615 B1 * 2/2015 ............ A01K 85/02

OTHER PUBLICATIONS

European Search Report in EP Application No. 25180887.9, dated Oct. 14, 2025, 13 pages.

(Continued)

*Primary Examiner* — Zoe Tam Tran
(74) *Attorney, Agent, or Firm* — Husch Blackwell LLP

(57) ABSTRACT

An artificial bait selectively configurable in a first configuration or a second configuration is provided. In the first configuration, a hook may be positioned and located proximate to an upper side of the artificial bait. In the second configuration, a hook may be positioned and located proximate to a lower side of the artificial bait. The artificial bait may include a body sized and shaped to resemble a natural food source for fish. In addition, a guide may be positioned and located in the body. In the first configuration, fishing line may extend through the guide to an upper side of the body. However, in the second configuration, the fishing line may extend through the body and the guide to a lower side of the body. Thus, a hook may be selectively coupled with the fishing line proximate to the upper side or the lower side of the body.

19 Claims, 4 Drawing Sheets

(56) References Cited

U.S. PATENT DOCUMENTS

| | | | | | |
|---|---|---|---|---|---|
| 2,820,315 | A * | 1/1958 | Lowe | A01K 85/16 | 43/42.35 |
| 3,205,609 | A * | 9/1965 | Knapton | A01K 85/16 | 43/42.22 |
| 3,218,750 | A * | 11/1965 | Lewin | A01K 85/16 | 446/159 |
| 3,590,513 | A * | 7/1971 | Lund | A01K 85/14 | 43/42.5 |
| 3,982,349 | A * | 9/1976 | Hills | A01K 85/16 | 43/42.39 |
| 4,139,963 | A * | 2/1979 | Ingram | A01K 85/16 | 43/42.36 |
| 5,233,785 | A * | 8/1993 | Ching | A01K 85/16 | 43/42.36 |
| 5,586,405 | A * | 12/1996 | Fike | A01K 85/16 | 43/42.31 |
| 2005/0204607 | A1 | 9/2005 | Nichols | | |
| 2007/0289198 | A1 * | 12/2007 | Rodels | A01K 85/01 | 43/42.36 |
| 2012/0137568 | A1 * | 6/2012 | Walsh | A01K 85/00 | 43/42.08 |
| 2015/0033612 | A1 * | 2/2015 | Stokes | A01K 83/00 | 43/42.1 |
| 2015/0107148 | A1 * | 4/2015 | Walsh | A01K 85/02 | 43/42.1 |
| 2017/0265444 | A1 * | 9/2017 | Wedam | A01K 99/00 | |
| 2023/0107358 | A1 * | 4/2023 | Trammell | A01K 85/18 | 43/42.08 |
| 2023/0337648 | A1 * | 10/2023 | Shemesh | A01K 85/08 | |

OTHER PUBLICATIONS

"Mulletron™ LT", zmanfishing.com, https://zmanfishing.com/collections/elaztech-plastics/products/mulletron-lt, (accessed Feb. 3, 2026), 8 pages.

* cited by examiner

Y-TUBE HOOK SYSTEM

CROSS-REFERENCE TO RELATED APPLICATIONS

None.

FIELD OF THE INVENTION

The present invention relates generally to an artificial fishing bait. More particularly, the present invention relates to a line-through fishing bait where a hook may be selectively positioned and located in one of at least two different positions on the artificial fishing bait.

BACKGROUND OF THE INVENTION

Artificial fishing baits are designed to help anglers attract fish by simulating or resembling a food source for fish. For example, some artificial fishing baits are designed to imitate the appearance and movement of a bait fish, a worm, a lizard, a leech, or another natural food source for fish.

A variety of artificial fishing baits are available to suit the preferences of each angler and to help anglers in a variety of situations. For example, some artificial baits include a hook affixed to an upper side of the artificial bait, while other artificial baits include a hook affixed to a lower side of the artificial bait. If an angler wishes to fish proximate to the bottom of the body of water, the angler may use an artificial bait having a hook affixed to the upper side of the artificial bait (e.g., to help prevent the hook from snagging on vegetation or debris). However, some anglers may wish to use an artificial bait with a hook affixed to the lower side of the artificial bait to help increase the likelihood of hooking a fish.

In addition, artificial baits may be provided with a variety of different hooks to suit the preferences of each angler and to help anglers fish in a variety of situations. For example, some artificial baits are coupled with a relatively large hook to help facilitate catching fish with relatively large jaw structures. In contrast, some other artificial baits are coupled with a relatively small hook to help facilitate catching fish with relatively small jaw structures. Further, some artificial baits may be coupled with treble hooks, while other artificial baits may be coupled with single hooks. Treble hooks may provide more potential points of contact than single hooks. Accordingly, there may be a higher likelihood of hooking a fish with a treble hook than with a single hook. Therefore, artificial baits are available with a variety of sizes and styles of hooks to help anglers in a variety of situations.

However, existing artificial baits are not without deficiencies. For one, existing artificial baits are generally not reconfigurable. Accordingly, an angler must own a variety of artificial baits if they wish to selectively change between sizes and/or styles of hooks. Further, an angler must own additional artificial baits if they wish to selectively change between a configuration where a hook is affixed to an upper side of an artificial bait and a configuration where a hook is affixed to a lower side of an artificial bait.

Further, existing artificial baits may be prone to damage when reeling in a fish. For example, when a fish is hooked, the fish may pull on the hook in a first direction, and the angler may pull on the fishing line in an opposite direction. The hook and the fishing line are each coupled to the artificial bait such that the force applied by the fish and the force applied by the angler may cause stress to develop in the artificial bait. This stress may cause the hook to tear the artificial bait or may cause the hook to become uncoupled from the artificial bait.

In addition, existing artificial baits may be prone to releasing a fish after the fish has been hooked. In particular, the artificial bait may be positioned and located adjacent to the hook when the fish is hooked. Accordingly, the fish may maneuver the artificial bait to move the hook and dislodge the hook from its mouth. Further, the weight of the artificial bait may provide leverage, which can assist the fish with dislodging the hook from its mouth in some situations.

Some manufacturers offer line-through fishing baits in an attempt to address some of the aforementioned issues. Line-through fishing baits are designed for the fishing line to extend through the artificial bait such that the hook can be coupled directly with the fishing line. Accordingly, an angler may replace the hook for a line-through fishing bait by decoupling the hook from the fishing line and tying the fishing line to a new hook. In addition, line-through fishing baits may allow the artificial bait to slide along the fishing line away from the hook when a fish is hooked.

However, existing line-through fishing baits do not allow the angler to adjust the position of the hook on the artificial bait (e.g., between a top-mounted position and a bottom-mounted position). Further, existing line-through fishing baits are generally only compatible with a single size and style of hook.

SUMMARY OF THE INVENTION

An artificial bait configured for catching fish is provided. The artificial bait includes a body sized and shaped to resemble a bait fish or another natural source of food for fish. Further, an inlet configured to receive a fishing line is positioned and located on the body proximate to an upper side of the body. The inlet is further configured to direct the fishing line toward a guide positioned and located in the body.

The guide is configured to selectively direct the fishing line through the artificial bait to either an upper side or a lower side of the body. In particular, the guide is a hollow component formed of at least one of ABS and PVC. The guide includes an entrance channel that is configured to receive the fishing line from the inlet. Further, the guide includes a first branch and a second branch that are each coupled with the entrance channel to receive the fishing line from the entrance channel. The first branch extends from the entrance channel to a slot positioned and located on the body proximate to an upper side of the body. The second branch extends from the entrance channel to an outlet positioned and located proximate to a lower side of the body. Accordingly, the guide may help to selectively direct fishing line through the artificial bait to one of the upper side and the lower side of the body. Thus, the artificial bait may be configured as a line-through fishing bait where a hook may be coupled with the fishing line proximate to an upper side or a lower side of the artificial bait.

In some embodiments, the slot is configured to receive a hook therein. When the hook is received in the slot, a proximal end of the hook may be received in the first branch of the guide. In particular, an eyelet of the hook may be received in a groove extending along the axial direction of the first branch. The groove is positioned and located concentrically with a circular-shaped cross-section of the first branch. In addition, the circular-shaped cross-section is sized and shaped to receive a knot formed in the fishing line. Thus, the groove may help to position the eyelet such that a knot coupling the fishing line with the eyelet may be received in the circular-shaped cross-section of the first branch.

These aspects are merely illustrative of the innumerable aspects associated with the present invention and should not be deemed as limiting in any manner. These and other aspects, features, and advantages of the present invention will become apparent from the following detailed description when taken in conjunction with the referenced drawings.

BRIEF DESCRIPTION OF THE DRAWINGS

For a better understanding of the present invention, reference may be made to the following accompanying drawings.

DETAILED DESCRIPTION OF THE INVENTION

Figure 1:
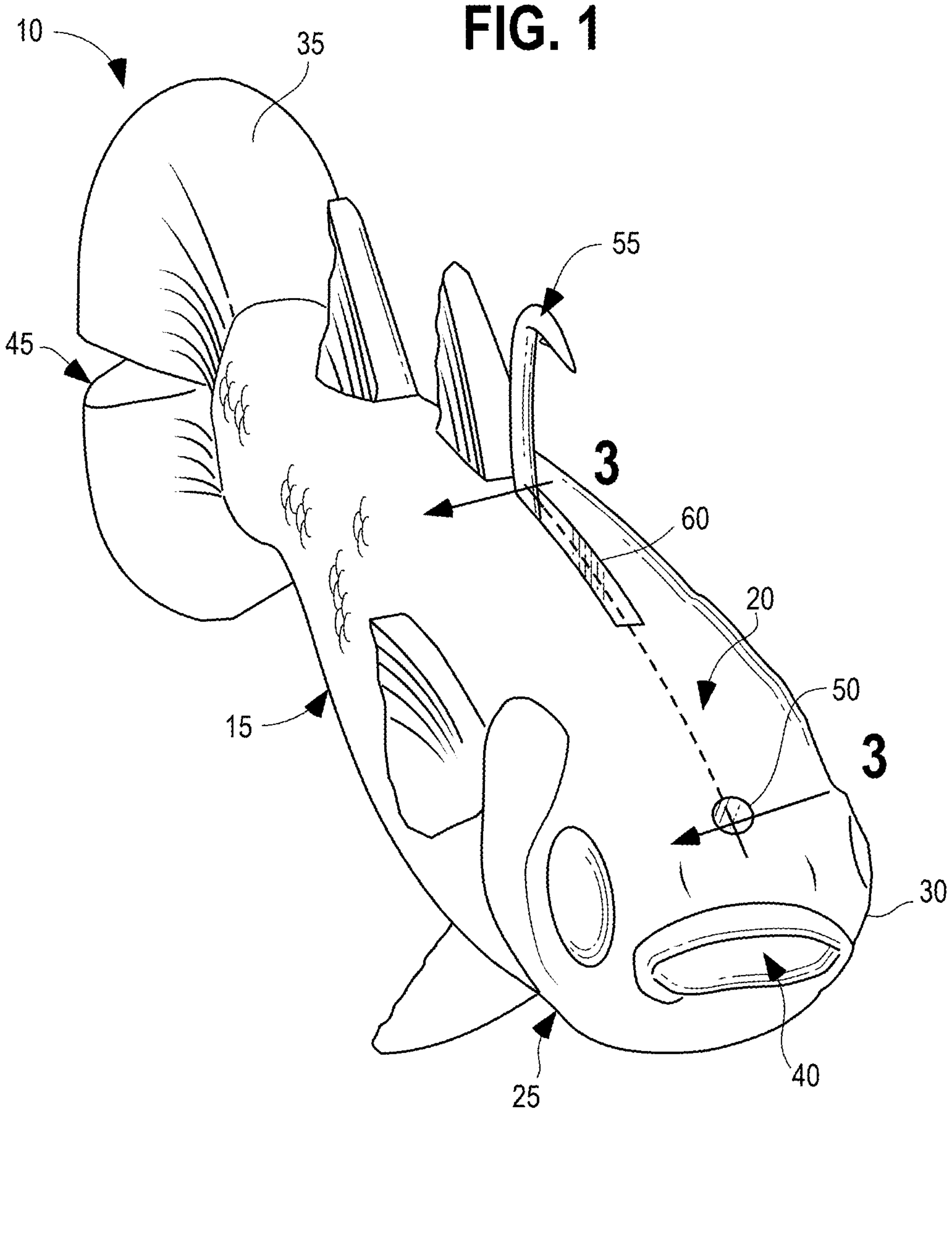
FIG. 1 is a perspective view of an artificial bait constructed according to the teachings hereof.

FIG. 1 illustrates a lure or artificial bait 10 with a body 15 configured for attracting fish to the artificial bait 10. The body 15 may be provided in a variety of suitable shapes, sizes, and configurations to help attract fish. For example, the body 15 may be composed of a polyurethane foam, a polymer material (e.g., plastic or rubber), a wood material, a cork material, a metal material, feathers, string, or a combination thereof. In addition, the body 15 may include a keel weight (not illustrated) positioned and located therein for controlling the buoyancy of the artificial bait 10. As a result, the body 15 may be configured to move through water in a manner that resembles the natural movement of a food source for fish. Further, in some embodiments, the body 15 may be brightly colored and may comprise a scented additive to help attract fish.

The body 15 may be sized and shaped to resemble a bait fish or a natural source of food for fish. For example, an upper side 20 of the body 15 may be sized and shaped to resemble a dorsal region of a bait fish, and a lower side 25 of the body 15 may be sized and shaped to resemble a ventral region of a bait fish. The body 15 may further include a head region 30 and a tail region 35 that are sized and shaped to resemble the head of a bait fish and the tail of a bait fish, respectively. The head region 30 may be positioned and located proximate to a first end 40 of the body 15, and the tail region 35 may be positioned and located proximate to a second end 45 of the body 15. However, in other embodiments, the body 15 may be sized and shaped to resemble another natural source of food for fish.

The artificial bait 10 may be configured to engage with a fishing line 47 (see, e.g., FIG. 2) to help facilitate casting and reeling in the artificial bait 10. For example, the artificial bait 10 may include an inlet 50 positioned and located proximate to the first end 40 of the body 15. The inlet 50 may be an aperture that extends into the body 15 and that is configured to receive the fishing line 47 therein. In particular, the inlet 50 may be positioned and located on the upper side 20 of the body 15, and the inlet 50 may include a circular-shaped cross-section extending into the body 15. However, other configurations for the inlet 50 are also contemplated.

In addition, the artificial bait 10 may be configured to receive a hook 55 to facilitate catching fish with the artificial bait 10. In a first configuration of the artificial bait 10, the hook 55 may be received in a slot 60 positioned and located on the upper side 20 of the body 15 (as illustrated). The slot 60 may be an elongated or rectangular-shaped opening that is sized and shaped to receive a single hook or a treble hook. However, in a second configuration (not illustrated) of the artificial bait 10, the hook 55 may be positioned and located proximate to the lower side 25 of the body 15, as will be described further herein.

Figure 2:
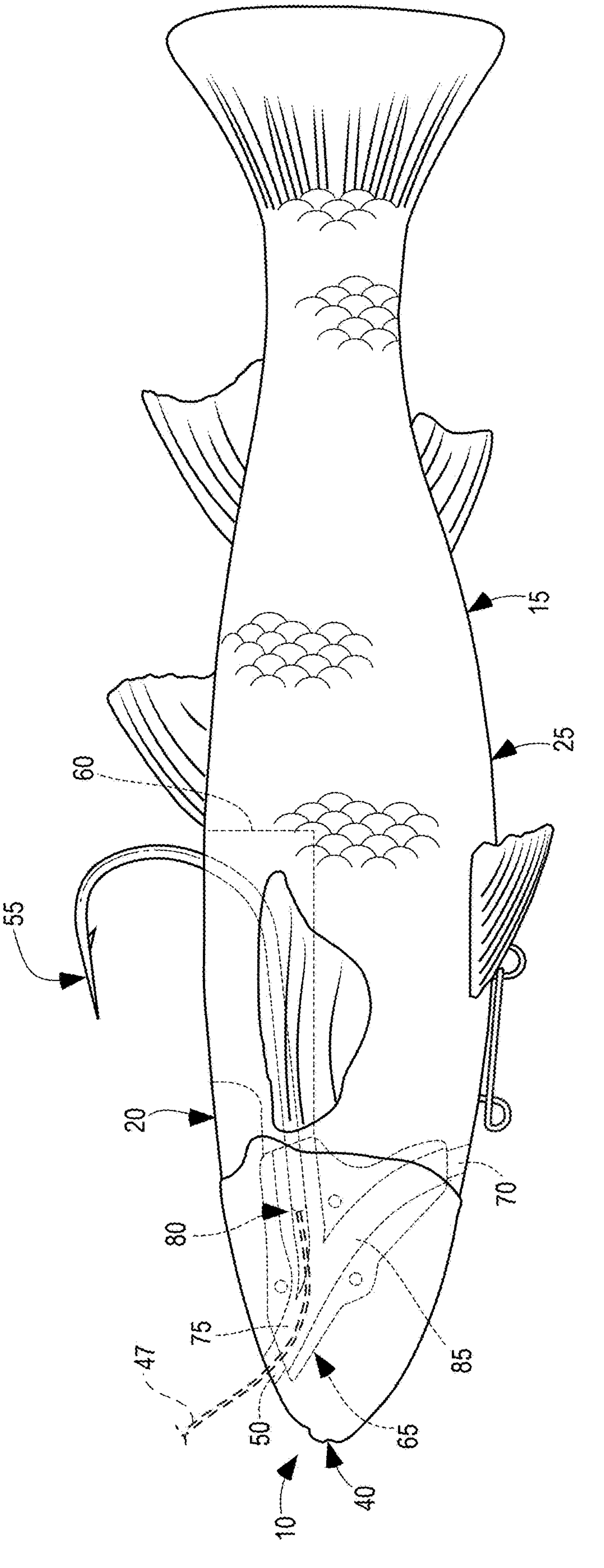
FIG. 2 is a semi-transparent front elevation view of the artificial bait of FIG. 1.

Turning to FIG. 2, the artificial bait 10 may include a guide 65 configured to direct the fishing line 47 through the artificial bait 10. The guide 65 may be a hollow component positioned and located in the body 15 proximate to the first end 40 of the body 15. The guide 65 may be composed of a plastic material (e.g., ABS, PVC, etc.), and the body 15 may be molded around the guide 65 such that the guide 65 is integrally formed with the body 15. In particular, the guide 65 may be placed in a mold for the body 15 before the body 15 is molded. In addition, a monofilament line may be extended through the guide 65 and coupled with a molding tool before the body 15 is molded. Then, after the body 15 has been molded, the monofilament line may be removed from the guide 65. Thus, the monofilament line may help to prevent molded material from entering the guide 65 as the body 15 is being molded. In addition, because the body 15 is molded around the monofilament line, the monofilament line may help to form one or more hollow channels in the body 15. The hollow channels formed by the monofilament line may correspond to the inlet 50 and an outlet 70, which are configured to direct the fishing line 47 to the guide 65 or to receive the fishing line 47 from the guide 65. However, other configurations for the guide 65 are also contemplated. For example, in some alternative embodiments, the guide 65 may be received by the body 15 after the body 15 has been formed. In such embodiments, the guide 65 may be retained in the body 15 by a friction fit, an interference fit, an adhesive, one or more fasteners, and/or other means known in the art.

The guide 65 may include an entry channel 75 positioned and located adjacent to the inlet 50 and coupled with the inlet 50 to receive the fishing line 47 from the inlet 50. The guide 65 may additionally include a first branch 80 and a second branch 85 that are each coupled with the entry channel 75 to receive the fishing line 47 from the entry channel 75. When the first branch 80 or the second branch 85 receives the fishing line 47 from the entry channel 75, the first branch 80 or the second branch 85 may direct the fishing line 47 through the guide 65 and the body 15. More specifically, the first branch 80 may extend from the entry channel 75 to the slot 60, and the second branch 85 may extend from the entry channel 75 to the outlet 70 positioned and located on the lower side 25 of the body 15.

When the fishing line 47 is extended through the entry channel 75 and the first branch 80, the fishing line 47 may be coupled with (e.g., tied to) a hook (e.g., the hook 55) positioned and located proximate to the slot 60 on the upper side 20 of the body 15. In contrast, when the fishing line 47 is extended through the entry channel 75 and the second branch 85, the fishing line 47 may be coupled with a hook (e.g., the hook 55) positioned and located proximate to the outlet 70 on the lower side 25 of the body 15. Thus, an angler may extend the fishing line 47 through either the first branch 80 or the second branch 85 to place the artificial bait 10 in the first configuration or the second configuration, respectively.

Although not specifically illustrated herein, it is to be recognized that the fishing line 47 may be coupled with a variety of different hooks when the artificial bait 10 is in the first configuration or the second configuration. In particular, the fishing line 47 may be coupled with a single hook (e.g., the hook 55) or a treble hook (not illustrated) when the artificial bait 10 is in either the first configuration or the second configuration. Further, the artificial bait 10 may be used with various sizes of hooks. To selectively change between a first hook and a second hook, an angler may decouple the first hook from the fishing line 47 (e.g., by cutting the fishing line 47). Then, the angler may optionally remove the fishing line 47 from the artificial bait 10. After the fishing line 47 is removed from the artificial bait 10, the angler may extend the fishing line 47 into the inlet 50 and through the entry channel 75 and one of the first branch 80 and second branch 85. Then, the angler may tie the fishing line 47 to the second hook once the fishing line 47 is extended through the artificial bait 10. For example, the fishing line 47 may be tied to a #2/0 single hook, a #3/0 single hook, a #4/0 single hook, a #5/0 single hook, a #4 treble hook, a #2 treble hook, a #1 treble hook, or a #1/0 treble hook. However, it is to be recognized that the artificial bait 10 may be used with additional sizes and styles of hooks not specifically discussed herein.

Figure 3:
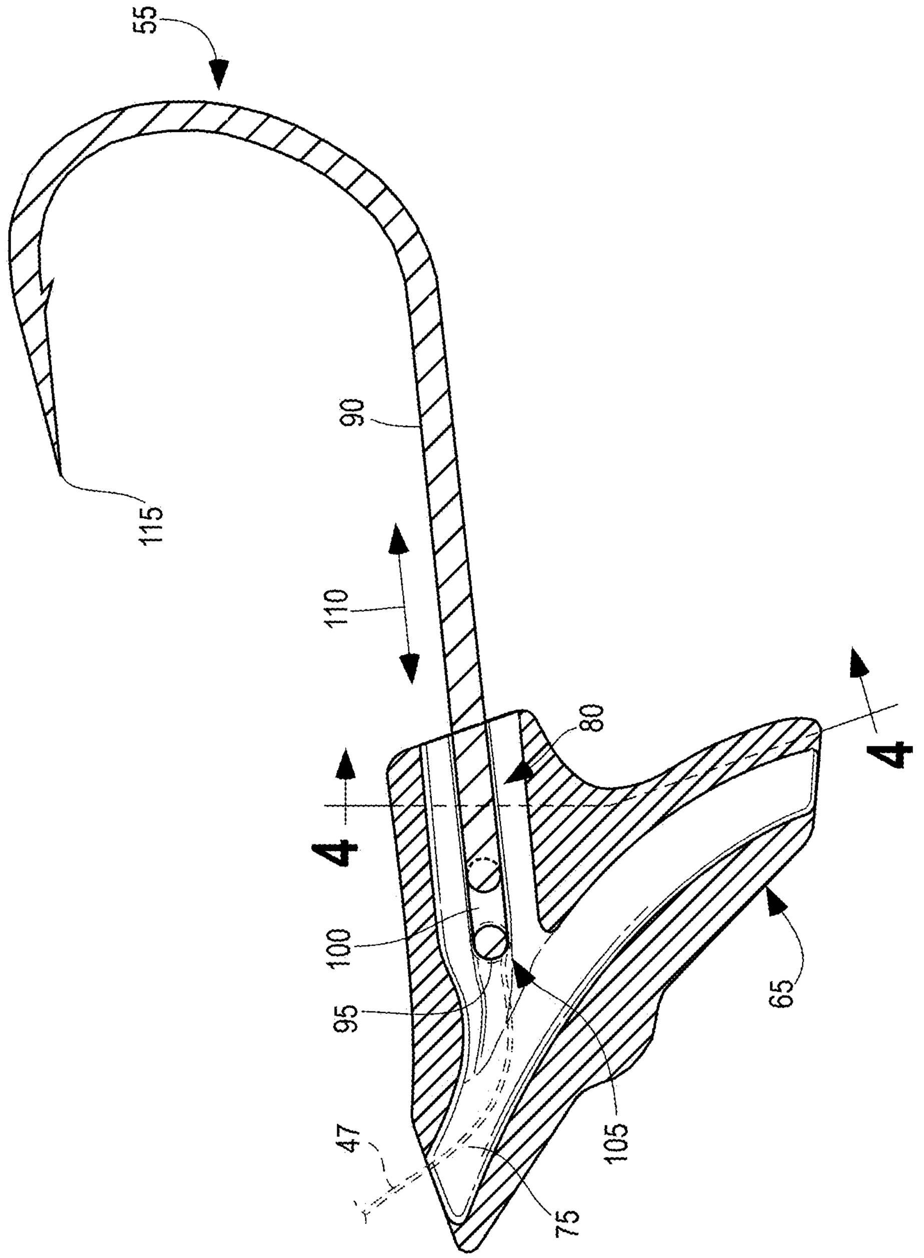
FIG. 3 is a front cross-section view of the artificial bait of FIG. 1 taken across line 3-3 of FIG. 1, wherein a body of the artificial bait is hidden to more clearly illustrate a guide and a hook.

FIG. 3 illustrates a cross-sectional view of the artificial bait 10 with the body 15 (see, e.g., FIG. 2) hidden to better illustrate the manner in which the guide 65 engages with the hook 55 when the artificial bait 10 is in the first configuration (as illustrated). In particular, the first branch 80 may include a diameter that is larger in size than a diameter of a shank 90 of the hook 55. Thus, a proximal end 95 of the hook 55 may be received in the first branch 80 when the artificial bait 10 is in the first configuration. In addition, an eyelet 100 of the hook 55 may be received in a groove 105 extending along an axial direction 110 of the first branch 80. Thus, the hook 55 may be selectively moveable along the axial direction 110 when the hook 55 is received in the first branch 80.

Because the hook 55 is selectively moveable in the first branch 80, the hook 55 may slide or move outwardly from the first branch 80 when a fish pulls on the hook 55 (e.g., from a distal end 115 of the hook 55). As the hook 55 moves outwardly from the first branch 80, the hook 55 may exit the slot 60 (see, e.g., FIG. 1), and the hook 55 may pull on the fishing line 47. As the hook 55 pulls on the fishing line 47, the hook 55 and the body 15 may move away from one another. In particular, the hook 55 may pull additional fishing line 47 through the entry channel 75 and the first branch 80. As a result, the fishing line 47 and the guide 65 may move relative to one another. As the fishing line 47 and the guide 65 move relative to one another, the guide 65 may slide along the fishing line 47 away from the hook 55. Because the body 15 is coupled with the guide 65, the body 15 may move away from the hook 55 as the guide 65 moves away from the hook 55. Thus, the body 15 and the hook 55 may move away from one another when a fish is hooked. By allowing the body 15 and the hook 55 to move away from one another, the artificial bait 10 may help to prevent damage (e.g., tears or rips) to the body 15. Further, the artificial bait 10 may reduce or prevent fish from using the weight of the body 15 as leverage for unhooking the hook 55.

Figure 4:
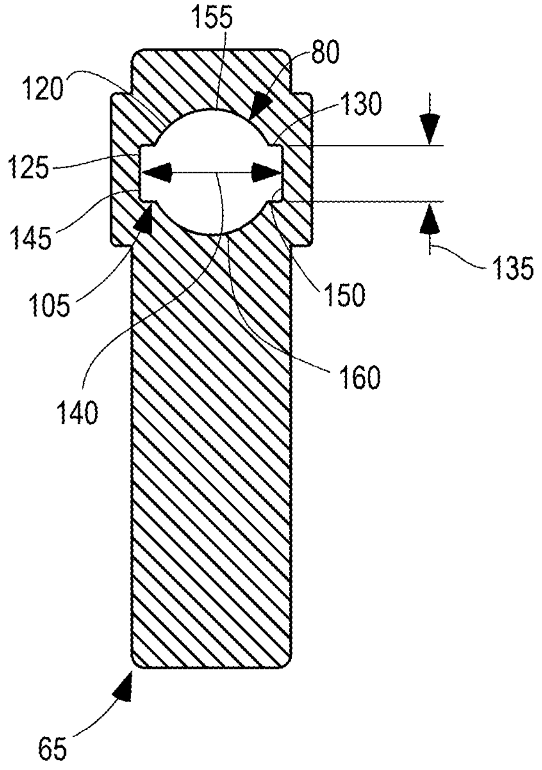
FIG. 4 is a side cross-section view of the guide of FIG. 3 taken across line 4-4 of FIG. 3.

Referring to FIG. 4, the first branch 80 may be configured to receive the hook 55 (see, e.g., FIG. 3) and to guide the hook 55 when the hook 55 is received therein. In particular, a cross-section 120 of the first branch 80 may be circular-shaped, although other cross-sectional shapes for the first branch 80 are also contemplated. The cross-section 120 may be larger than a diameter of the shank 90 (see, e.g., FIG. 3) and larger than a diameter of the fishing line 47 (see, e.g., FIG. 2). However, the cross-section 120 of the first branch 80 may be smaller than a width of the eyelet 100 (see, e.g., FIG. 3). Thus, the fishing line 47 and the shank 90 may be received in the cross-section 120 of the first branch 80. However, the eyelet 100 may be too large to fit in the cross-section 120. As a result, the eyelet 100 may be retained, secured, or locked in the groove 105.

The groove 105 may be configured to engage with the eyelet 100 such that the eyelet 100 is moveable only in the axial direction 110. In particular, the groove 105 may include a first notch 125 and a second notch 130 projecting outwardly from opposing sides of the cross-section 120. The notches 125, 130 may be rectangular-shaped and may extend along the axial direction 110 of the first branch 80. A height 135 of the notches 125, 130 may be slightly larger than or the same size as a height of the eyelet 100. Further, a width 140 extending between a first edge 145 of the first notch 125 and a second edge 150 of the second notch 130 may be slightly larger than or the same size as a width of the eyelet 100. Accordingly, the notches 125, 130 may engage with the eyelet 100 when the eyelet 100 is received in the groove 105. Thus, the groove 105 may help to guide the eyelet 100 along the axial direction 110, and the guide 65 may prevent the hook 55 from moving in directions other than the axial direction 110.

As further illustrated in FIG. 4, the cross-section 120 may be configured to receive a knot coupling the fishing line 47 with the eyelet 100. For example, the cross-section 120 may be sized and shaped to receive a knot formed in a monofilament fishing line having a diameter as large as about 1.1 millimeters (or about 0.043 inches). The groove 105 may be positioned and located concentrically with the cross-section 120 to help position the eyelet 100 and the knot relative to the cross-section 120. In particular, the notches 125, 130 may be positioned and located approximately equidistant from an upper end 155 and a lower end 160 of the cross-section 120. In addition, the first edge 145 and the second edge 150 may be positioned and located approximately equidistant from the cross-section 120. Accordingly, the groove 105 may help to position the eyelet 100 concentrically with the cross-section 120 when the eyelet 100 is received in the groove 105. As a result, a knot coupled with the eyelet 100 may be received by the cross-section 120 when the eyelet 100 is received by the groove 105.

Although not specifically illustrated herein, it is to be understood that the second branch 85 may also include a circular-shaped cross-section. The circular-shaped cross-section of the second branch 85 may be larger than a diameter of the fishing line 47 but smaller than a width of an eyelet 100. In contrast to the first branch 80, the second branch 85 may be provided without a groove positioned and located therein. Accordingly, the second branch 85 may be sized and shaped to block the hook 55 from being received therein. Instead, the fishing line 47 may extend through the second branch 85, and the hook 55 may be positioned and located outside of the second branch 85 (e.g., adjacent to the outlet 70). However, similar to the first branch 80, the second branch 85 may allow fishing line 47 to be pulled therethrough (e.g., when a fish pulls on the hook 55). Thus, the artificial bait 10 may allow the body 15 to move away from the hook 55 when the artificial bait 10 is in the second configuration.

In alternative embodiments of the artificial bait 10, the body 15 and the guide 65 may be provided in a variety of suitable configurations. For example, in some alternative embodiments, the second branch 85 may include a groove configured for engaging with an eyelet of a hook (e.g., similar to the groove 105). In yet other embodiments, the first branch 80 may be provided without a groove such that the first branch 80 and/or the second branch 85 have a circular-shaped cross-section. In other embodiments, the body 15 may include a second slot extending into the body 15 proximate to the lower side 25. In such embodiments, a hook may be received in the lower side 25 of the body 15. Further, in some other embodiments, the body 15 may be provided without a slot 60. Instead, the first branch 80 may extend to an upper outlet positioned and located on the body 15 proximate to the upper side 20.

From the foregoing, it will be seen that the various embodiments of the present invention are well adapted to attain all the objectives and advantages hereinabove set forth together with still other advantages which are obvious, and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles, and scope of the present invention.

Many changes, modifications, variations, and other uses and applications of the present invention will, however, become apparent to those skilled in the art after considering the specification and the accompanying drawings. All such changes, modifications, variations, and other uses and applications which do not depart from the spirit and scope of the invention are deemed to be covered by the invention, which is limited only by the claims which follow.

What is claimed is:

1. An artificial bait comprising:
- a body having an upper side with a slot and a lower side with an outlet;
- a guide received in the body, the guide including:
  - a component positioned and located at least partially in the body; and
  - a branch including a groove to engage an eyelet of a hook;
- wherein when the artificial bait is in a first position, a fishing line extends through the guide to the upper side of the body out of the body via the slot such that the hook is selectively couplable with the fishing line proximate to the upper side of the body; and
- wherein when the artificial bait is in a second position, the fishing line extends through the guide to the lower side of the body out of the body via the outlet such that the hook is selectively couplable with the fishing line proximate to the lower side of the body.

2. The artificial bait of claim 1, wherein the guide is configured to receive a proximal end of the hook.

3. The artificial bait of claim 1, wherein the branch has a cross-section sized and shaped to receive a knot coupled with the eyelet.

4. The artificial bait of claim 1, further including a slot positioned and located proximate to the upper side of the body, the slot configured to receive the hook at least partially therein.

5. The artificial bait of claim 1, wherein the body is molded from polyurethane foam.

6. The artificial bait of claim 1, further including an inlet formed in the body, the inlet configured to receive the fishing line and to direct the fishing line to the guide.

7. The artificial bait of claim 1, wherein the body is molded around the guide such that the body is integrally formed with the guide.

8. The artificial bait of claim 1, wherein the guide is formed of at least one of PVC and ABS.

9. The artificial bait of claim 1, wherein the body is configured to resemble a bait fish or another natural source of food for fish.

10. An artificial bait comprising:
- a body having a first side and a second side;
- an inlet positioned and located on the body;
- a slot extending into the body proximate to the first side of the body, wherein the slot is configured to receive a hook therein;
- an outlet positioned and located on the body proximate to the second side;
- a guide positioned and located in the body, the guide including:
  - an entry channel coupled with the inlet;
  - a first branch extending from the entry channel to the slot;
  - a second branch extending from the entry channel to the outlet; and
  - a structure separating the first branch and the second branch;
  - wherein a diameter of the second branch is smaller than the hook such that the hook is not receivable therein;
- wherein when the artificial bait is in a first position, a fishing line extends through the guide to the first side of the body out of the body via the slot such that the hook is selectively couplable with the fishing line proximate to the first side of the body; and
- wherein when the artificial bait is in a second position, the fishing line extends through the guide to the second side of the body out of the body via the outlet such that the hook is selectively couplable with the fishing line proximate to the second side of the body.

11. The artificial bait of claim 10, wherein the slot is configured to receive a hook therein.

12. The artificial bait of claim 11, wherein the artificial bait is configured for the hook to exit from the slot when a fish pulls on the hook.

13. The artificial bait of claim 10, wherein the guide is configured for a fishing line to extend through the entry channel and one of the first branch and the second branch.

14. The artificial bait of claim 13, wherein the entry channel, the first branch, and the second branch are sized and shaped such that the fishing line may be pulled therethrough.

15. The artificial bait of claim 10, further including a groove positioned and located in the first branch, the groove configured to receive an eyelet of a hook.

16. The artificial bait of claim 15, wherein the first branch extends in an axial direction from the entry channel toward the slot, and wherein the groove extends in the axial direction along the first branch.

17. The artificial bait of claim 15, wherein the first branch includes a circular-shaped cross-section positioned and located concentrically with the groove such that the circular-shaped cross-section is configured to receive a knot coupled with the eyelet.

18. The artificial bait of claim 10, wherein the first side of the body is an upper side of the body, and wherein the second side of the body is a lower side of the body.

19. The artificial bait of claim 10, wherein the first side of the body is sized and shaped to resemble a dorsal region of a bait fish, and wherein the second side of the body is sized and shaped to resemble a ventral region of a bait fish.

* * * * *